US007767081B2

(12) United States Patent
Meeks

(10) Patent No.: US 7,767,081 B2
(45) Date of Patent: Aug. 3, 2010

(54) MAGNETIC FUEL CONDITIONER

(76) Inventor: Jasper L. Meeks, 3759 Highway 351, Abilene, TX (US) 79601

( * ) Notice: Subject to any disclaimer, the term of this patent is extended or adjusted under 35 U.S.C. 154(b) by 725 days.

(21) Appl. No.: 11/392,129

(22) Filed: Mar. 29, 2006

(65) Prior Publication Data

US 2007/0227958 A1 Oct. 4, 2007

(51) Int. Cl.
*C02F 1/48* (2006.01)
*F02M 33/00* (2006.01)

(52) U.S. Cl. ........................ 210/222; 210/695; 123/538

(58) Field of Classification Search ................. 210/222, 210/695; 123/538
See application file for complete search history.

(56) References Cited

U.S. PATENT DOCUMENTS 4,564,448 A * 1/1986 O'Meara, Jr. ............... 210/222
5,558,765 A * 9/1996 Twardzik .................... 210/222
5,804,067 A * 9/1998 McDonald et al. .......... 210/222
5,882,514 A * 3/1999 Fletcher ...................... 210/222
6,890,432 B1 * 5/2005 Witz et al. .................. 210/222

* cited by examiner

*Primary Examiner*—David A Reifsnyder
(74) *Attorney, Agent, or Firm*—W. Thomas Timmons

(57) ABSTRACT

A magnetic fuel conditioner according to the present invention includes an inner pipe, an outer pipe surrounding the inner pipe with sufficient clearance that fuel can pass between the inner pipe and the outer pipe, a plurality of magnets placed inside the inner pipe with like magnetic poles facing each other, and a plurality of mild steel disks placed between each pair of magnets. In a preferred form, the inner pipe and the outer pipe are made of stainless steel. An outer sleeve of mild steel surrounds the outer pipe. In a preferred arrangement, each of the plurality of magnets is cylindrically shaped to tightly fit into the inner pipe and is in the range of from about 9000 gauss to about 10,000 gauss. Typically, the plurality of magnets comprise neodymium. In such an arrangement, each disk of mild steel is approximately one quarter inch thick and approximately the same diameter as the magnets in the plurality of magnets. There are two stainless steel cylinders of approximately the same diameter as the cylindrically shaped magnets. One of the stainless steel cylinders is placed in each end of the inner pipe and secured to retain the plurality of magnets within the inner pipe. A magnetic fuel conditioner according to the present invention is especially well suited when the fuel to be conditioned is diesel fuel.

14 Claims, 1 Drawing Sheet

MAGNETIC FUEL CONDITIONER

CROSS-REFERENCE TO RELATED APPLICATIONS

None

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to treating fuel flowing through a fuel line, and in particular to the magnetic treatment of fuel flowing through a fuel line.

2. Description of Related Art

U.S. Pat. No. 5,558,765, issued to Twardzik, discloses an Apparatus for Subjecting Hydrocarbon-Based Fuels to Intensified Magnetic Fields for Increasing Fuel Burning Efficiency. The Twardzik patent teaches an apparatus for exposing hydrocarbon based fuels to a magnetic field comprising at least two permanent magnets having opposite faces polarized north and south, a cover box for containing each of said magnets and having a bottom opening and a peripheral depending flange having curved hollows for fitting closely about a fluid compartment vessel. It also discloses a backing plate for closing the bottom opening being recessed inward to permit the close fit of the fluid containment vessel within the curved hollows and strapping means for securing the cover box in fixed diametrically opposed position about the fluid containment vessel for creating an electromagnetic circuit having an enhanced substantially uniform non-directional magnetic flux density for the polarization of the molecules of the fuel to increase the combustion efficiency thereof.

U.S. Pat. No. 6,890,432 issued to Witz et al. gives a detailed background of magnetically treating fuel. The Witz et al. patent shows the use of an upper and a lower magnetic assembly which work together to nearly surround a fuel line.

BRIEF SUMMARY OF THE INVENTION

A magnetic fuel conditioner according to the present invention includes an inner pipe, an outer pipe surrounding the inner pipe with sufficient clearance that fuel can pass between the inner pipe and the outer pipe, a plurality of magnets placed inside the inner pipe with like magnetic poles facing each other, and a plurality of mild steel disks placed between each pair of magnets. In a preferred form, the inner pipe and the outer pipe are made of stainless steel. An outer sleeve of mild steel surrounds the outer pipe.

In a preferred arrangement, each of the plurality of magnets is cylindrically shaped to tightly fit into the inner pipe and is in the range of from about 5000 gauss to about 10,000 gauss and preferably from about 9000 gauss to about 10,000 gauss. Typically, the plurality of magnets comprise neodymium.

In such an arrangement, each disk of mild steel is approximately one quarter inch thick and approximately the same diameter as the magnets in the plurality of magnets. There are two stainless steel cylinders of approximately the same diameter as the cylindrically shaped magnets. One of the stainless steel cylinders is placed in each end of the inner pipe and secured to retain the plurality of magnets within the inner pipe. A magnetic fuel conditioner according to the present invention is especially well suited when the fuel to be conditioned is diesel fuel.

These and other objects, advantages and features of this invention will be apparent from the following description taken with reference to the accompanying drawing, wherein is shown a preferred embodiment of the invention.

DETAILED DESCRIPTION OF THE INVENTION

Figure 1:
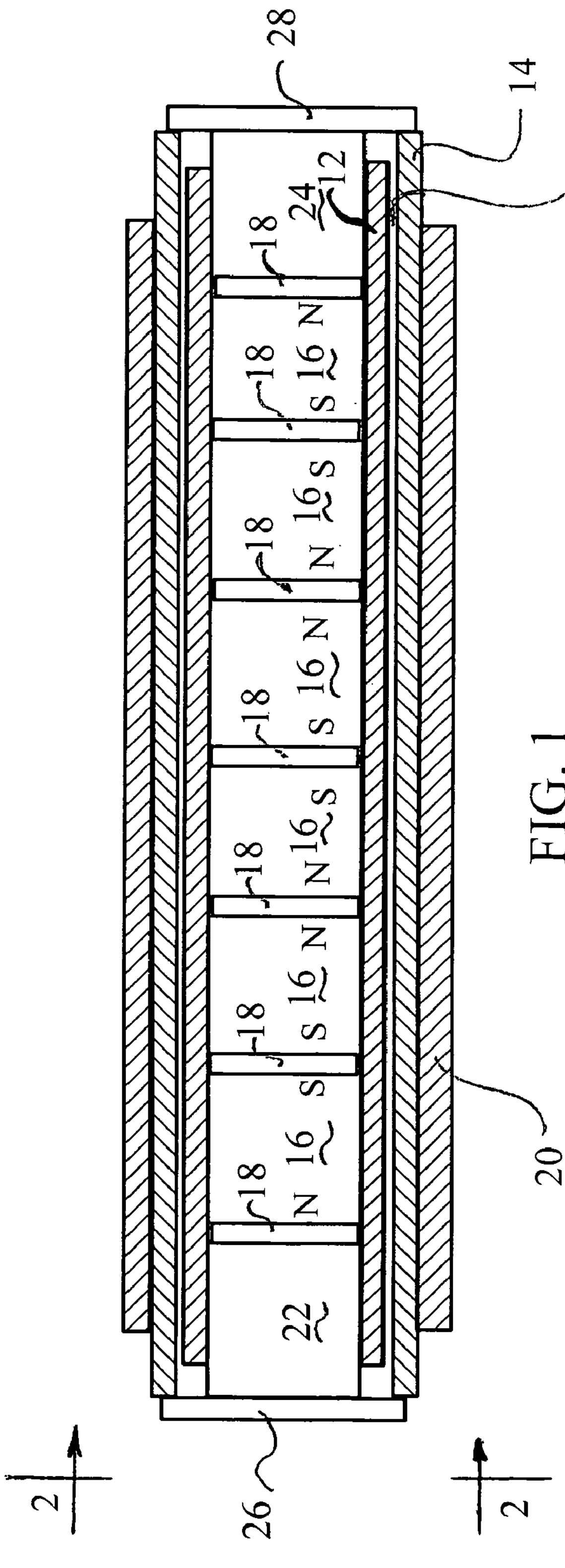
FIG. 1 is a cross-section of a magnetic fuel conditioner according to the present invention taken along the length of the pipes and sleeve, but wherein magnets and separating disks are not in cross-section.
Figure 2:
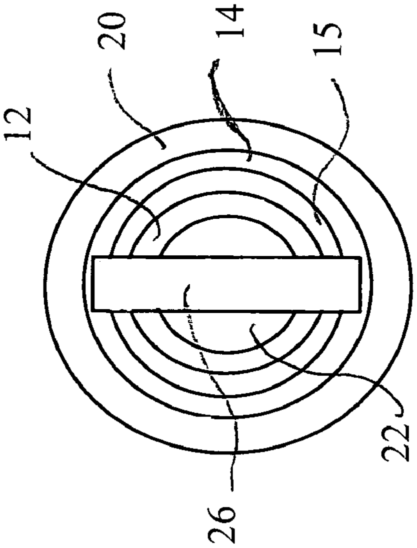
FIG. 2 is an end view of the magnetic fuel conditioner shown in FIG. 1, taken along the view 2-2 of FIG. 1.

Referring now to the drawing, and in particular to FIG. 1 and to FIG. 2, a magnetic fuel conditioner according to the present invention is referred to generally by reference numeral 10. Magnetic fuel conditioner 10 includes an inner pipe 12, an outer pipe 14 surrounding the inner pipe with sufficient clearance 15 that fuel can pass between the inner pipe and the outer pipe, a plurality of magnets 16 placed inside the inner pipe with like magnetic poles facing each other, and a plurality of mild steel disks 18 placed between each pair of magnets. In a preferred form, the inner pipe and the outer pipe are made of stainless steel. An outer sleeve 20 of mild steel surrounds the outer pipe.

In a preferred arrangement, each of the plurality of magnets 16 is cylindrically shaped to tightly fit into inner pipe 12 and is in the range of from about 5000 gauss to about 10,000 gauss and preferably from about 9000 gauss to about 10,000 gauss. Typically, the plurality of magnets comprise neodymium.

In such an arrangement, each disk of mild steel is approximately one quarter inch thick and approximately the same diameter as the magnets in the plurality of magnets. There are two stainless steel cylinders 22 and 24 of approximately the same diameter as the cylindrically shaped magnets. One of the stainless steel cylinders is placed in each end of the inner pipe and secured to retain the plurality of magnets within the inner pipe. Stainless steel cylinders 22 and 24 are easily secured with cross bars 26 and 28 which are welded onto outer pipe 14, although they could be secured in other ways. In the embodiment illustrated, a mild steel disk 18 is also placed between the end magnets and cylinders 22 and 24, although these two disks can be omitted. A magnetic fuel conditioner according to the present invention is especially well suited when the fuel to be conditioned is diesel fuel. In such an arrangement, a preferred use of a magnetic fuel conditioner according to the present invention is in the fuel line between the fuel filter and the injector pump.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A magnetic fuel conditioner comprising in combination:

an inner pipe;

an outer pipe surrounding the inner pipe with sufficient clearance that fuel can pass between the inner pipe and the outer pipe, wherein fuel to be conditioned flows between the inner pipe and the outer pipe;

an outer sleeve of mild steel surrounding the outer pipe;

a plurality of magnets placed in a longitudinal arrangement inside the inner pipe with like magnetic poles facing each other; and a plurality of mild steel disks placed between each pair of magnets.

2. A magnetic fuel conditioner according to claim 1, wherein the inner pipe and the outer pipe comprise stainless steel.

3. A magnetic fuel conditioner according to claim 2, wherein each of the plurality of magnets is cylindrically shaped to tightly fit into the inner pipe and is in the range of from about 5000 gauss to about 10,000 gauss.

4. A magnetic fuel conditioner according to claim 3, wherein the plurality of magnets comprise neodymium.

5. A magnetic fuel conditioner according to claim 4, wherein each disk of mild steel is approximately one quarter inch thick and approximately the same diameter as the magnets in the plurality of magnets.

6. A magnetic fuel conditioner according to claim 5, further comprising two stainless steel cylinders of approximately the same diameter as the cylindrically shaped magnets, wherein one of the stainless steel cylinders is placed in each end of the inner pipe and secured to retain the plurality of magnets within the inner pipe.

7. A magnetic fuel conditioner according to claim 6, wherein the fuel to be conditioned is diesel fuel.

8. A magnetic fuel conditioner according to claim 7 wherein the magnetic fuel conditioner is installed in diesel fuel line between the fuel filter and the injector pump.

9. A magnetic fuel conditioner according to claim 2, wherein each of the plurality of magnets is cylindrically shaped to tightly fit into the inner pipe and is in the range of from about 9000 gauss to about 10,000 gauss.

10. A magnetic fuel conditioner according to claim 9, wherein the plurality of magnets comprise neodymium.

11. A magnetic fuel conditioner according to claim 10, wherein each disk of mild steel is approximately one quarter inch thick and approximately the same diameter as the magnets in the plurality of magnets.

12. A magnetic fuel conditioner according to claim 11, further comprising two stainless steel cylinders of approximately the same diameter as the cylindrically shaped magnets, wherein one of the stainless steel cylinders is placed in each end of the inner pipe and secured to retain the plurality of magnets within the inner pipe.

13. A magnetic fuel conditioner according to claim 12, wherein the fuel to be conditioned is diesel fuel.

14. A magnetic fuel conditioner according to claim 13 wherein the magnetic fuel conditioner is installed in diesel fuel line between the fuel filter and the injector pump.

* * * * *